US010850721B2

(12) United States Patent
Niglas et al.

(10) Patent No.: US 10,850,721 B2
(45) Date of Patent: Dec. 1, 2020

(54) SYSTEM AND METHOD FOR FILLING A TRAILER RESERVOIR

(71) Applicant: Bendix Commercial Vehicle Systems LLC, Elyria, OH (US)

(72) Inventors: Paul C Niglas, Avon, OH (US);
Michael D Tober, Avon, OH (US);
Randy J Salvatora, Federal Way, WA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 76 days.

(21) Appl. No.: 15/942,027

(22) Filed: Mar. 30, 2018

(65) Prior Publication Data
US 2019/0299952 A1 Oct. 3, 2019

(51) Int. Cl.
| | |
|---|---|
| *B60T 13/68* | (2006.01) |
| *B60T 13/40* | (2006.01) |
| *B60T 8/17* | (2006.01) |
| *B60T 8/72* | (2006.01) |
| *B60T 11/32* | (2006.01) |
| *B60T 13/26* | (2006.01) |
| *B60T 15/04* | (2006.01) |
| *B60T 13/66* | (2006.01) |

(Continued)

(52) U.S. Cl.
CPC .............. *B60T 13/403* (2013.01); *B60T 7/20* (2013.01); *B60T 8/1708* (2013.01); *B60T 8/72* (2013.01); *B60T 11/326* (2013.01); *B60T 13/268* (2013.01); *B60T 13/662* (2013.01); *B60T 13/683* (2013.01); *B60T 15/041* (2013.01); *B60T 17/221* (2013.01); *B60Q 9/00* (2013.01)

(58) Field of Classification Search
CPC ...... B60T 8/323; B60T 8/1708; B60T 15/041; B60T 15/48; B60T 11/326; B60T 13/403
See application file for complete search history.

(56) References Cited

U.S. PATENT DOCUMENTS

| | | | |
|---|---|---|---|
| 4,472,001 | A | 9/1984 | Fannin |
| 4,673,222 | A | 6/1987 | Knight |

(Continued)

FOREIGN PATENT DOCUMENTS

EP 1095835 A1 5/2001

OTHER PUBLICATIONS

International Search Report for counterpart International Appln. No. PCT/US2019/024482, dated Jul. 22, 2019, 4 pages.

(Continued)

*Primary Examiner* — Bradley T King
(74) *Attorney, Agent, or Firm* — Brian Kondas; Cheryl Greenly; Eugene Clair

(57) ABSTRACT

A controller on a tractor portion of an articulated vehicle includes an electrical input port adapted to receive an electrical input signal based on a command to unpark a trailer portion of the articulated vehicle and an electronic processor adapted to: receive the electrical input signal from the electrical input port; identify, based on the electrical input signal, when the command to unpark the trailer is received at the electrical input port; and based on the command to unpark the trailer, transmit an electrical output signal to an electrical output port for causing supplemental compressed air to be communicated from the tractor to the trailer for filling an air tank on the trailer using a quick-fill mode.

13 Claims, 3 Drawing Sheets

(51) Int. Cl.
  *B60T 7/20* (2006.01)
  *B60T 17/22* (2006.01)
  *B60Q 9/00* (2006.01)

(56) References Cited

U.S. PATENT DOCUMENTS

| | | | |
|---|---|---|---|
| 4,763,959 A * | 8/1988 | Vandemotter | B60T 13/66 303/63 |
| 5,061,015 A * | 10/1991 | Cramer | B60T 13/263 303/15 |
| 5,236,250 A | 8/1993 | Moody et al. | |
| 5,466,053 A * | 11/1995 | Koelzer | B60T 13/265 303/7 |
| 5,511,860 A * | 4/1996 | Wallestad | B60T 13/265 303/41 |
| 5,553,928 A * | 9/1996 | Hart | B60T 13/265 303/40 |
| 6,062,652 A | 5/2000 | Eberling | |
| 8,249,789 B2 | 8/2012 | Ramler et al. | |
| 8,282,173 B2 | 10/2012 | Forster et al. | |
| 9,434,366 B1 | 9/2016 | Taneyhill et al. | |
| 10,118,597 B2 * | 11/2018 | Taneyhill | B60T 8/1708 |
| 2004/0124697 A1 * | 7/2004 | MacGregor | B60T 17/08 303/89 |
| 2006/0097569 A1 * | 5/2006 | Eberling | B60T 8/323 303/122.15 |
| 2007/0262637 A1 | 11/2007 | Bennett | |
| 2008/0258542 A1 | 10/2008 | Soupal | |
| 2012/0285565 A1 * | 11/2012 | Ramler | B60T 13/265 137/565.18 |
| 2018/0229708 A1 * | 8/2018 | Sieker | B60T 7/20 |

OTHER PUBLICATIONS

Written Opinion of the International Searching Authority for counterpart International Appln. No. PCT/US2019/024482, dated Jul. 22, 2019, 6 pages.

Information on Search Strategy for counterpart International Appln. No. PCT/US2019/024482, mailed Jul. 22, 2019, 1 page.

* cited by examiner

SYSTEM AND METHOD FOR FILLING A TRAILER RESERVOIR

BACKGROUND

The present invention relates to filling a trailer reservoir. It finds particular application in conjunction with quick-filling the trailer reservoir and will be described with particular reference thereto. It will be appreciated, however, that the invention is also amenable to other applications.

Articulated vehicles include a towing portion (e.g., a tractor) and a towed portion (e.g., a trailer). Each of the tractor and the trailer includes respective tanks for storing compressed air used to brake the vehicle. The air tank on the trailer is filled with compressed air generated on the tractor. Compressed air communicated from the tractor to the trailer air tank passes through a tractor protection valve on the tractor. The tractor protection valve protects air on the tractor in the event of a downstream failure (e.g., leak) on the trailer.

While charging the trailer air tank, the compressed air passes through a small orifice in a trailer dash valve before being communicated to the trailer air tank via the tractor protection valve. Since the small orifice restricts flow of the compressed air used for charging the trailer air tank, the charging time of the trailer air tank tends is extended. The extended fill time becomes a bigger issue when the trailer has a "spring brake priority" valve that releases the trailer parking brakes before charging the trailer air tanks, which are used for supplying compressed air to the trailer service brakes. Therefore the spring brake priority valve may result in an undesirable situation in which the trailer spring brakes are released before the trailer air tank is sufficiently charged for applying the trailer service brakes.

The present invention provides a new and improved apparatus and method which addresses the above-referenced problems.

SUMMARY

In one aspect of the present invention, it is contemplated that a controller on a tractor portion of an articulated vehicle includes an electrical input port adapted to receive an electrical input signal based on a command to unpark a trailer portion of the articulated vehicle and an electronic processor adapted to: receive the electrical input signal from the electrical input port; identify, based on the electrical input signal, when the command to unpark the trailer is received at the electrical input port; and based on the command to unpark the trailer, transmit an electrical output signal to an electrical output port for causing supplemental compressed air to be communicated from the tractor to the trailer for filling an air tank on the trailer using a quick-fill mode.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
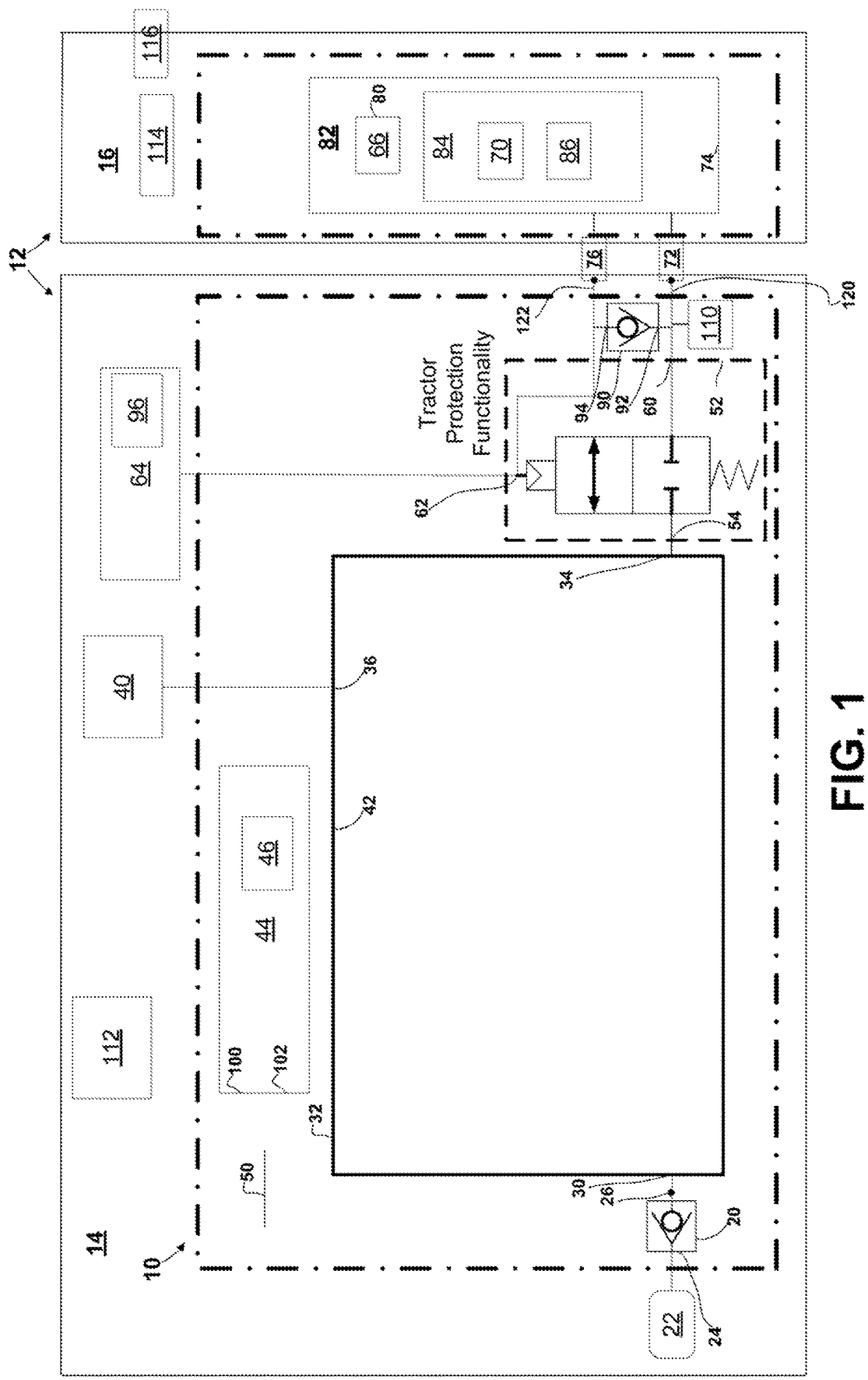
FIG. 1 illustrates a schematic representation of a simplified component diagram of an exemplary valve system in a first state in accordance with one embodiment of an apparatus illustrating principles of the present invention.

With reference to FIG. 1, a simplified component diagram of an exemplary system 10 for fluidly communicating pressurized fluid (e.g., compressed air) is illustrated in accordance with one embodiment of the present invention. The system 10 is part of an associated vehicle combination 12 (e.g., a vehicle), which includes a tractor portion 14 and a trailer portion 16, and includes an isolation check valve 20. The isolation check valve 20 receives a pneumatic fluid (e.g., air) from a source such as, for example, a reservoir 22 (e.g., an air tank). The isolation check valve 20 includes a pneumatic supply port 24 and a pneumatic delivery port 26.

The pressurized pneumatic fluid at the pneumatic delivery port 26 is fluidly communicated to a supply port 30 of a trailer control valve 32. Delivery of the pressurized pneumatic fluid from the trailer control valve supply port 30 to a trailer control valve delivery port 34 is selectively controlled based on at least one of a driver demand control signal and an electronic signal (e.g., a quick-fill signal).

In the illustrated embodiment, the driver demand control signal is a pneumatic signal received at a trailer control valve control port 36 (e.g., a pneumatic port) from a foot brake valve 40. The foot brake valve 40 is controlled (e.g., depressed) by an operator of the vehicle 12 to demand service braking on both the tractor 14 and the trailer 16. More specifically, to demand more braking, the operator depresses the foot brake valve 40 farther. Full fluid communication is achieved when the foot brake valve 40 is fully depressed. In other embodiments, it is contemplated that the driver demand control signal is an electronic signal received at an electronic trailer control valve control port based on the driver's demand for service braking on both the tractor 14 and the trailer 16. Although the trailer control valve 32 is illustrated as a pneumatic valve, other embodiments in which the trailer control valve 32 is an electronic valve or an electro-pneumatic valve are also contemplated.

As described in more detail below, the quick-fill signal is an electronic signal received at an electrical input port 42 of the trailer control valve 32. Upon receiving the electronic quick-fill signal at the electrical input port 42, full fluid communication between the trailer control valve supply port 30 and the trailer control valve delivery port 34 is achieved. In other words, the quick-fill signal causes the trailer control valve 32 to simulate the foot brake valve 40 being fully depressed.

In one embodiment, the electrical input port 42 electrically communicates with a controller 44 and a processor 46 via a vehicle data bus 50.

A tractor protection module 52 includes a supply port 54 (e.g., input), a delivery port 60 (e.g., output) and a control port 62. The tractor protection supply port 54 fluidly communicates with the tractor protection delivery port 60 based on a control signal received at the tractor protection control port 62. In the illustrated embodiment, the tractor protection control port 62 is a pneumatic port that receives a pneumatic control signal. However, other embodiments, in which the tractor protection control port 62 is an electronic port that receives an electronic control signal, are also contemplated.

In the illustrated embodiment, the tractor protection supply port 54 fluidly communicates with the tractor protection delivery port 60 based on a pneumatic pressure at the tractor protection control port 62. In one embodiment, the pneumatic pressure at the tractor protection control port 62 is received from a trailer park control valve 64 and is referred to as a trailer park brake pressure.

In one embodiment, the trailer park control valve 64 is a pneumatic valve actuated by the operator by, for example, manually taking action (e.g., moving) a "plunger" switch. Once actuated, the trailer park control valve 64 passes the compressed air from the reservoir 22 to the tractor protection control port 62, via the trailer park control valve 64, to disengage (e.g., unpark) park brakes 66 on the trailer 16. It is to be understood that the trailer park control valve 64 restricts the flow of the compressed air from the reservoir 22 to the tractor protection control port 62 via, for example, an orifice. Since the flow of the compressed air from the reservoir 22 to the tractor protection control port 62 is restricted, the time for filling a trailer reservoir 70 (e.g., trailer air tank) is increased.

The trailer park brake pneumatic pressure at the tractor protection control port 62 (e.g., trailer park brake pressure) is below a predetermined threshold if the plunger switch is in a first position so that the associated vehicle combination 12 is in a parked state (see FIG. 1) (e.g., a trailer park brake 66 is engaged). Conversely, the trailer park brake pneumatic pressure at the tractor protection control port 62 (e.g., trailer park brake pressure) is at least the predetermined threshold if the plunger switch is in a second position so that the associated vehicle combination 12 is in an unparked state (see FIG. 2) (e.g., the trailer park brake 66 is disengaged). While the vehicle combination 12 is in the unparked state (see FIG. 2), the tractor protection supply port 54 fluidly communicates with the tractor protection delivery port 60 so that the pneumatic pressure at the tractor protection supply port 54 is fluidly communicated to the tractor protection delivery port 60, during which time the tractor protection module 52 is also in an unparked state. While the vehicle combination 12 is in the parked state (see FIG. 1), the tractor protection supply port 54 does not fluidly communicate with the tractor protection delivery port 60, during which time the tractor protection module 52 is also in an parked state.

The pneumatic pressure at the tractor protection delivery port 60 fluidly communicates with a control glad-hand 72, which also fluidly communicates with a control port 74 of the trailer service brake system 84. The pneumatic pressure at the tractor protection control port 62 (e.g., the trailer park brake pressure) fluidly communicates with a supply glad-hand 76, which also fluidly communicates with a supply port 80 of the trailer park brake 66 and the trailer reservoir 70.

The trailer 16 includes a trailer brake system 82, which includes the trailer park brake 66 and a trailer service brake system 84. The trailer service brake system 84 includes the trailer reservoir 70 that stores the compressed air to be used for actuating trailer service brakes 86. The trailer park brake 66 is engaged when the compressed air delivered from the supply glad-hand 76 is below a trailer park brake threshold pressure and disengaged when the compressed air delivered from the supply glad-hand 76 is at least the trailer park brake threshold pressure.

A one-way check valve 90, which includes a supply port 92 and a delivery port 94, is between the tractor protection control port 62 and the tractor protection delivery port 60. The one-way check valve 90 allows one-way fluid communication of the pressurized air from the check valve supply port 92, which fluidly communicates with the tractor protection delivery port 60, to the check valve delivery port 94, which fluidly communicates with the tractor protection control port 62, based on the relative pressures at the tractor protection delivery port 60 and the tractor protection control port 62. For example, if the pressure of the compressed air at the tractor protection delivery port 60 is greater than the pressure at the tractor protection control port 62 by a check-valve threshold pressure, the compressed air is passed from the check valve supply port 92 to the check valve delivery port 94. Consequently, the compressed air passed from the tractor protection delivery port 60 to the supply glad-hand 76 is fluidly communicated to the trailer park brake 66 and the trailer reservoir 70.

Figure 2:
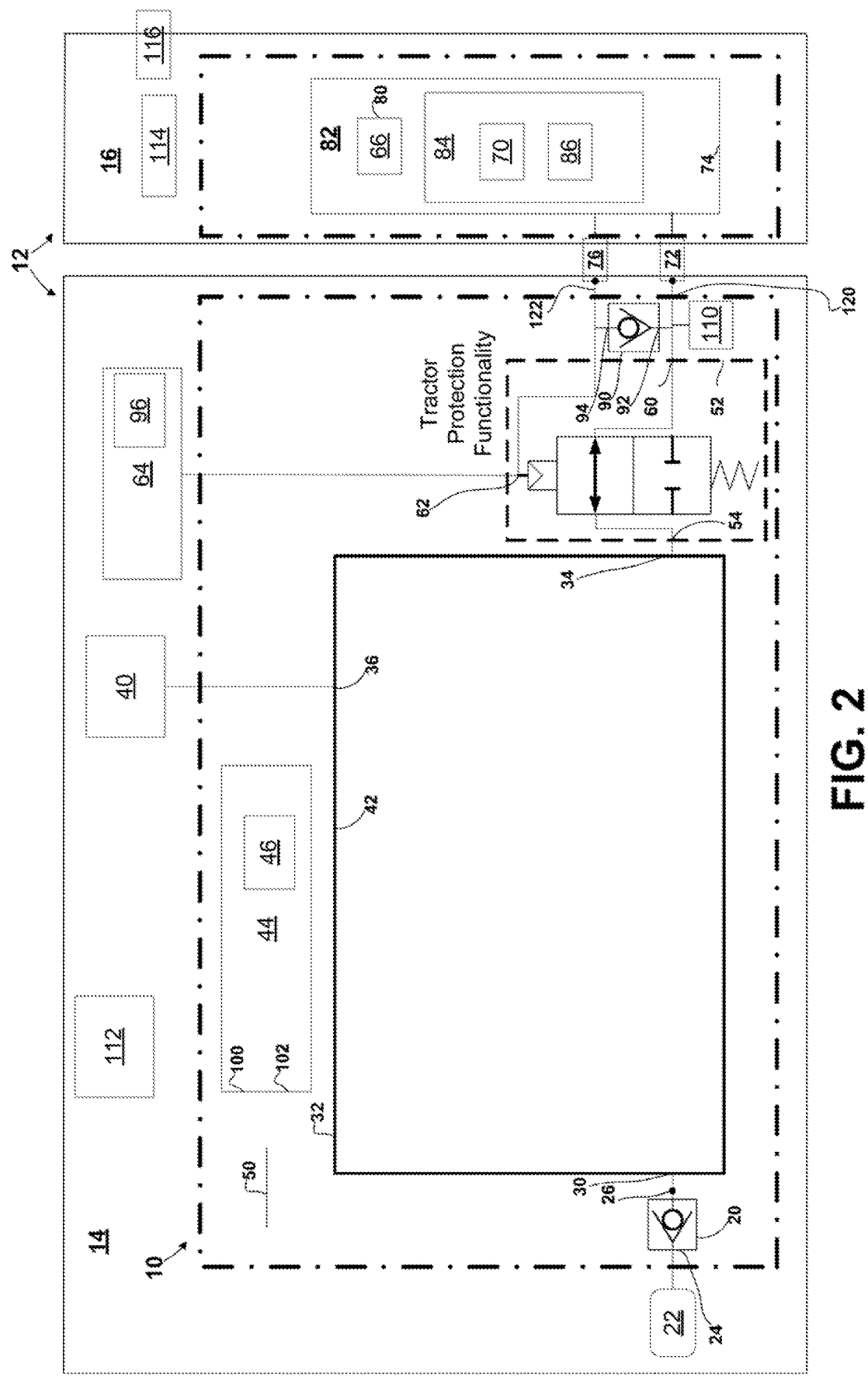
FIG. 2 illustrates a schematic representation of a simplified component diagram of an exemplary valve system in a second state in accordance with one embodiment of an apparatus illustrating principles of the present invention.

While the vehicle combination 12 is in the parked state (see FIG. 1), the trailer park brake pneumatic pressure at the check valve delivery port 94 is below the check-valve threshold pressure. To initiate a command to unpark the trailer park brakes 66, the operator moves the plunger of the trailer park control valve 64 from the first position (FIG. 1) to the second position (FIG. 2). An electrical sensor 96 detects the trailer park control valve 64 is set to the second position. Once the electrical sensor 96 detects the trailer park control valve 64 is set to the second position, the electrical sensor 96 transmits an electrical signal to the controller 44, via the data bus 50, indicating the command to unpark the trailer park brake 66 has been initiated. Alternatively, the electrical sensor 96 transmits a signal indicating the position of the trailer park control valve 64 whenever the trailer park control valve 64 is moved from one position to another position.

The electrical signal identifying the command to unpark the trailer park brake 66 has been initiated is received at an electrical input port 100 of the controller 44. The processor 46, which in one embodiment is included in the controller 44, receives the electrical signal indicating the command to unpark the trailer park brake 66 has been initiated. The processor 46 transmits an electrical output signal to an output port 102 of the controller 44 based on the command to unpark the trailer park brake 66. For example, upon receiving the command to unpark the trailer park brake 66, the processor 46 identifies the command to unpark the trailer park brake 66 has been initiated and transmits the electrical quick-fill signal to the output port 102 of the controller 44 for filling the trailer reservoir 70 relatively more quickly.

The electrical quick-fill signal is transmitted from the output port 102 of the controller 44 to the trailer control valve electrical input port 42. Once the electrical quick-fill signal is received at the trailer control valve electrical input port 42, the trailer control valve 32 is set to a quick-fill mode so that full fluid communication between the trailer control valve supply port 30 and the trailer control valve delivery port 34 is achieved. Since the trailer control valve 32 is set to full fluid communication and the tractor protection module 52 is in the unparked state (FIG. 2), the full pressure of the compressed air from the reservoir 22 is transmitted to the tractor protection module delivery port 60 via the trailer control valve supply port 30, the trailer control valve delivery port 34 and the tractor protection module supply port 54. As long as the pressure at the tractor protection module delivery port 60 (e.g., the pressure at the check valve supply port 92) is higher than the pressure at the tractor protection module control port 62 (e.g., the pressure at the check valve delivery port 94) by at least the check-valve threshold pressure, the compressed air at the check valve supply port 92 passes through the check valve 90 to the check valve delivery port 94.

The compressed air at the check valve supply port 92 that passes through the check valve 90 to the check valve delivery port 94 is referred to as supplemental compressed air that supplements the primary compressed air already at the check valve delivery port 94 (e.g., the tractor protection module delivery port 60). As discussed above, the volumetric flow of the primary compressed air to the check valve delivery port 94 is restricted. Both the primary and supplemental compressed air at the tractor protection module delivery port 60 combine and pass to the trailer brake system 82 via the supply glad-hand 76. The combined primary and supplemental compressed air create an increased volumetric flow of the compressed air passed to the trailer brake system 82 via the supply glad-hand 76. More specifically, the volumetric flow of the combined primary and supplemental compressed air is increased relative to the volumetric flow of the primary compressed air alone (e.g., the standard volumetric flow used during a standard-fill mode, which is also referred to as a non-quick-fill mode). The increased volumetric flow of the compressed air passed to the trailer brake system 82 is fluidly communicated to both the trailer park brake 66 and the trailer reservoir 70, which results in both quicker release of the trailer park brake 66 and quicker fill time of the trailer reservoir 70, relative to standard volumetric flow. The quicker release of the trailer park brake 66 and quicker fill time of the trailer reservoir 70, relative to standard volumetric flow, result from the operator moving the plunger of the trailer park control valve 64 from the first position (FIG. 1) to the second position (FIG. 2), which causes the trailer control valve 32 to be set to the quick-fill mode.

A pressure sensor 110 transmits an electronic signal based on a pressure at the tractor protection delivery port 60 (e.g., the pressure at the check valve supply port 92). The input port 100 of the controller 44 and the processor 46 receive the electronic signal from the pressure sensor 110. If the processor 46 determines the pressure at the tractor protection delivery port 60 is below a tractor protection delivery port threshold, the processor 46 transmits an electronic signal to activate a notification device 112 for notifying the operator of the vehicle 12 that the pressure at the tractor protection delivery port 60 is below the tractor protection delivery port threshold.

A wheel speed sensor 114 is associated with a wheel 116 on the vehicle 12. The wheel speed sensor 114 transmits a signal to the controller 44 and the processor 46 based on the speed of the wheel 116. The processor 46 transmits a signal to the notification device 112 based on the speed of the wheel 116 and the fill mode (e.g., either quick-fill mode or standard-fill mode). For example, if the rotational speed of the wheel 116 is above a predetermined speed threshold and the fill mode is not set to the quick-fill mode, the processor 46 transmits a signal to the notification device 112 to notify the vehicle operator the vehicle 12 is moving above the predetermined speed threshold and the fill mode is not set to the quick-fill mode, which could indicate an unsafe driving condition.

Figure 3:
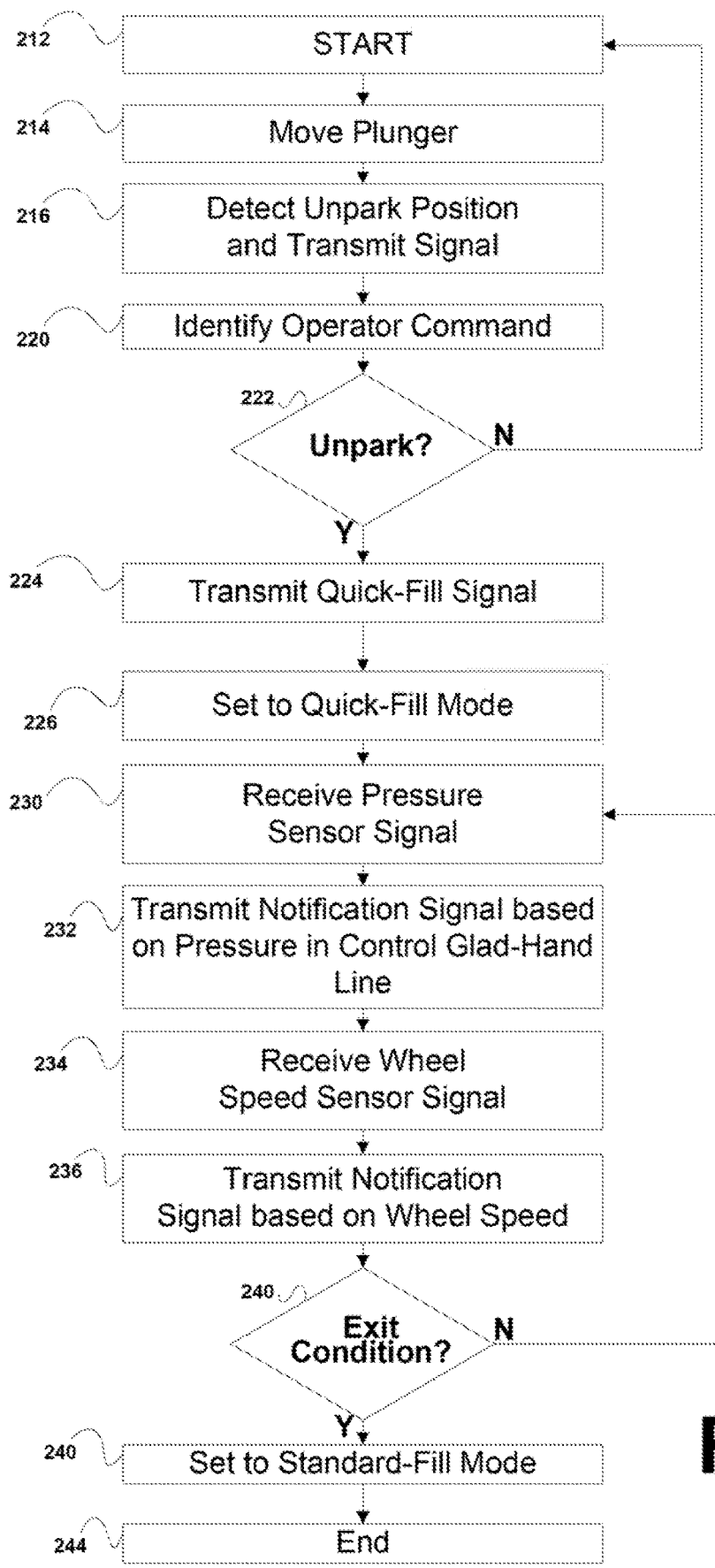
FIG. 3 is an exemplary methodology of filling a trailer reservoir in accordance with one embodiment illustrating principles of the present invention.

With reference to FIG. 3, an exemplary methodology of the system shown in FIGS. 1 and 2 for filling a trailer air tank using a quick-fill mode is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

The method starts in a step 212. During a step 214, the operator of the vehicle moves the plunger switch to the second position to actuate the trailer park control valve 64 so that the primary compressed air passes from the reservoir 22 to the tractor protection control port 62, via the orifice in the trailer park control valve 64, to disengage (e.g., unpark) the park brakes 66 on the trailer 16. Upon actuating the trailer park control valve 64, the electrical sensor 96 detects the trailer park control valve 64 is set to the second position and transmits, during a step 216, an electrical signal indicating the command to unpark the trailer park brake 66 has been initiated. The controller 44 and processor 46 receive the electrical signal and identify the operator's desire (e.g., command) to unpark the trailer park brakes 66 in a step 220.

A determination is made in a step 222 whether the operator commanded to unpark the trailer park brakes 66. If it is determined in the step 222 that the operator did not command to unpark the trailer park brakes 66, control returns to the step 212. Otherwise, if it is determined in the step 222 that the operator did command to unpark the trailer park brakes 66, control passes to a step 224.

In the step 224, the quick-fill signal is transmitted to the electrical input port 42 of the trailer control valve 32 for setting the trailer control valve 32 to the quick-fill mode so that there is full fluid communication between the trailer control valve supply port 30 and the trailer control valve delivery port 34 in a step 226. As discussed above, the quick-fill mode causes the supplemental compressed air to be transmitted from the tractor protection module delivery port 60 to the trailer brake system 82 via a pneumatic line 120 on the tractor 14 associated with the control glad-hand 72, the check valve 90, a pneumatic line 122 on the tractor 14 associated with the supply glad-hand 76 (where the supplemental compressed air is combined with the primary compressed air), and the supply glad-hand 76.

A pressure sensor signal is received by the controller 44 and processor 46 in a step 230. If it is determined in a step 232 that the pressure in the pneumatic line 120 on the tractor 14 associated with the control glad-hand 72 is below a predetermined threshold, a notification signal is transmitted to actuate notification device 112.

In a step 234, the controller 44 and processor 46 receive the electrical wheel speed signal from the wheel speed sensor 114. If it is determined in a step 236 that the rotational speed of the wheel 116 is above the predetermined speed threshold and the fill mode is not set to the quick-fill mode, the processor 46 transmits the signal to the notification device 112 to notify the vehicle operator the vehicle 12 is moving above the predetermined speed threshold and the fill mode is not set to the quick-fill mode.

In a step 240, a determination is made whether an exit condition exists. An exit condition exists, for example, if the operator depresses the foot brake valve 40, if the processor 46 receives a signal from the wheel speed sensor 114 indicating the rotational speed of the wheel 116 is above the predetermined speed threshold, if the tractor 14 is unparked, and/or if a transmission of the vehicle 12 is put in gear, etc. If it is determined in the step 240 that an exit condition does not exist, control returns to the step 230. Otherwise, if it is determined in the step 240 that an exit condition exists, control passes to a step 242.

In the step 242, after the trailer reservoir 70 is filled, the trailer control valve 32 is set to the standard-fill mode. Control then passes to a step 244 to end.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for controlling a filling operation of an air tank on a trailer portion of an articulated vehicle, the method comprising:
    receiving an electrical input signal based on a command to unpark the trailer;
    identifying, based on the electrical input signal, when an operator of the vehicle desires to unpark the trailer; and
    based on the command to unpark the trailer, communicating a supplemental portion of the compressed air from a tractor portion of the articulated vehicle to the trailer for filling the air tank on the trailer using a quick-fill mode, wherein the supplemental portion of the compressed air is added to a primary portion of the compressed air resulting in an increased volumetric flow of the compressed air to the trailer.

2. The method as set forth in claim 1, further including:
    transmitting an electrical output signal for causing the supplemental portion of the compressed air to be communicated from the tractor portion of the articulated vehicle to the trailer for filling the trailer air tank via a supply line associated with a supply glad-hand fluidly communicating with the trailer air tank.

3. The method as set forth in claim 1, wherein the communicating includes:
    communicating the supplemental portion of the compressed air to the air tank on the trailer via a control line associated with a control glad-hand.

4. The method as set forth in claim 3, further including:
    receiving a pressure sensor signal indicative of a pressure in the control line; and
    notifying the operator of the vehicle based on the pressure sensor signal.

5. The method as set forth in claim 3, further including:
    based on the command to unpark the trailer, communicating a primary portion of the compressed air to the air tank via a supply line associated with a supply glad-hand.

6. The method as set forth in claim 1, further including:
    receiving a wheel speed sensor signal; and
    notifying the operator of the vehicle based on the wheel speed sensor signal.

7. The method as set forth in claim 6, wherein:
    notifying the driver if the wheel speed sensor signal indicates the associated wheel has a rotational speed above a predetermined speed threshold.

8. A system for communicating compressed air, the system comprising:
    a tractor protection valve, on a tractor of an articulated vehicle, the tractor protection valve including:
    a pneumatic supply line communicating the compressed air from the tractor to a trailer reservoir on a trailer of the articulated vehicle;
    a pneumatic control line communicating the compressed air from the tractor to a trailer control valve that selectively controls communication of the compressed air from the trailer reservoir to a trailer brake based on a pressure in the pneumatic control line; and
    a one-way check valve permitting the compressed air to be communicated from the control line to the supply line, based on relative pressures in the supply line and the control line;
    an electronic controller on the tractor, the controller comprising:
    an electrical input port adapted to receive an electrical input signal based on a command to disengage a trailer park brake;
    an electronic processor adapted to:
    receive the electrical input signal from the electrical input port;
    identify, based on the electrical input signal, when the command to disengage the trailer park brake is received at the electrical input port; and
    based on the command to disengage the trailer park brake, transmit an electrical output signal to an electrical output port for causing a supplemental portion of the compressed air to be communicated from the tractor to the trailer reservoir via the control line, the one-way check valve and the supply line, the supplemental portion of the compressed air is added to a primary portion of the compressed air in the supply line and results in an increased volumetric flow of the compressed air to the trailer reservoir.

9. The system as set forth in claim 8, further including:
    an operator control valve selectively set between a first position to disengage the trailer park brake and a second position to engage the trailer park brake.

10. The system as set forth in claim 9, wherein:
    setting the operator control valve to the first position causes the electrical input signal to be transmitted to the electrical input port.

11. The system as set forth in claim 9, wherein:
    the primary portion of the compressed air is communicated from the tractor to the trailer reservoir via the supply line, without being communicated through the control line or the one-way check valve, when the operator control valve is set to the first position.

12. The system as set forth in claim 8, wherein:
    the electrical input port is also adapted to receive a wheel speed sensor signal;
    the electronic processor is also adapted to receive the wheel speed sensor signal from the electrical input port; and
    the electronic processor is adapted to notify an operator of vehicle based on the wheel speed sensor signal.

13. The system as set forth in claim 12, wherein:
    the electronic processor is adapted to transmit a notification signal for notifying the driver if the wheel speed sensor signal indicates the associated wheel has a rotational speed above a predetermined speed threshold.

* * * * *